United States Patent
Cookson et al.

(10) Patent No.: US 7,162,146 B2
(45) Date of Patent: Jan. 9, 2007

(54) SYSTEM AND METHOD FOR THE ASSERTION AND IDENTIFICATION OF RIGHTS INFORMATION IN AN ANALOG VIDEO SIGNAL

(75) Inventors: Christopher J. Cookson, Studio City, CA (US); Dean S. Marks, Sherman Oaks, CA (US); Spencer Stephens, Toluca Lake, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 358 days.

(21) Appl. No.: 10/773,949

(22) Filed: Feb. 6, 2004

(65) Prior Publication Data

US 2004/0240846 A1 Dec. 2, 2004

Related U.S. Application Data

(60) Provisional application No. 60/460,928, filed on Apr. 7, 2003, provisional application No. 60/446,726, filed on Feb. 11, 2003, provisional application No. 60/445,660, filed on Feb. 7, 2003.

(51) Int. Cl.
G11B 15/04 (2006.01)
H04N 5/91 (2006.01)

(52) U.S. Cl. .......................... 386/94; 360/15; 360/60; 380/201; 380/203

(58) Field of Classification Search ................ 360/15, 360/60; 380/201, 203, 210; 386/94; 382/100, 382/232
See application file for complete search history.

(56) References Cited

U.S. PATENT DOCUMENTS

| | | | | |
|---|---|---|---|---|
| 4,807,031 A | * | 2/1989 | Broughton et al. | 348/460 |
| 6,094,228 A | * | 7/2000 | Ciardullo et al. | 348/473 |
| 6,229,572 B1 | * | 5/2001 | Ciardullo et al. | 348/473 |
| 6,433,946 B1 | | 8/2002 | Ogino | |
| 6,661,905 B1 | * | 12/2003 | Chupp et al. | 382/100 |
| 6,850,619 B1 | * | 2/2005 | Hirai | 380/203 |
| 6,975,746 B1 | | 12/2005 | Davis et al. | |
| 6,987,862 B1 | | 1/2006 | Rhoads | |
| 6,992,726 B1 | * | 1/2006 | Chupp et al. | 348/473 |
| 7,020,304 B1 | * | 3/2006 | Alattar et al. | 382/100 |
| 2003/0175013 A1 | * | 9/2003 | Kato et al. | 386/94 |

* cited by examiner

*Primary Examiner*—Thai Q. Tran
*Assistant Examiner*—Mishawn Dunn
(74) *Attorney, Agent, or Firm*—Gottlieb, Rackman & Reisman, P.C.

(57) ABSTRACT

A method for processing an analog video signal that represents a work for which rights information is asserted. The signal includes a rights assertion mark (RAM) in the video portion of the signal within the visible picture such that capture of the picture will include the mark. The signal also includes copy control information (CCI) bits in the vertical blanking interval of the signal for representing copying and redistribution rules. If the RAM is present and the CCI bits are present, then the copying and redistribution rules represented by the CCI bits are applied. If the RAM is present but the CCI bits are not, then the most restrictive copying and redistribution rules that can be represented by the CCI bits are applied.

21 Claims, 6 Drawing Sheets

PRIOR ART

PRIOR ART

| CGMS-A | RAM | Action | Redistribution |
|---|---|---|---|
| Copy Freely | Not present | Copying allowed | RC bit, else not controlled |
| Copy Freely | Present | Encrypted copy permitted | RC bit, else not allowed |
| Copy Once | Don't care | Encrypted "Copy No More" copy permitted | RC bit, else not allowed |
| Copy No More | Don't care | Copy not permitted, display only | RC bit, else not allowed |
| Copy Never | Don't care | Copy not permitted, display only | RC bit, else not allowed |
| Not present | Not present | Copying not controlled | Not controlled |
| Not present | Present | "Copy Never", copy not permitted, display only | Not allowed |

Figure 4A

| Detected State | | | Meaning | | | | | |
|---|---|---|---|---|---|---|---|---|
| CGMS-A | | | Copy Permission | | Redistribution Permission | | Copy to be Encrypted? | |
| P0 | P1 | RC | w/o VRAM | with VRAM | w/o VRAM | with VRAM | w/o VRAM | with VRAM |
| N | N | N | Copy Freely | Copy Never | Allowed | Not Allowed | No | (No Copies) |
| 0 | 0 | N | Copy Freely | Copy Freely | Allowed | Not Allowed | No | Yes |
| 0 | 1 | N | Copy No More | Copy No More | Not Allowed | Not Allowed | (No Copies) | (No Copies) |
| 1 | 0 | N | Copy Once | Copy Once | Not Allowed | Not Allowed | Yes | Yes |
| 1 | 1 | N | Copy Never | Copy Never | Not Allowed | Not Allowed | (No Copies) | (No Copies) |
| N | 0 | 0 | Copy Freely | Copy Never | Allowed | Allowed | No | (No Copies) |
| 0 | 0 | 0 | Copy Freely | Copy Freely | Allowed | Allowed | No | No |
| 0 | 1 | 0 | Copy No More | Copy No More | Invalid RC | Not Allowed | (No Copies) | (No Copies) |
| 1 | 0 | 0 | Copy Once | Copy Once | Invalid RC | Not Allowed | Yes | Yes |
| 1 | 1 | 0 | Copy Never | Copy Never | Invalid RC | Not Allowed | (No Copies) | (No Copies) |
| N | 0 | 1 | Copy Freely | Copy Never | Not Allowed | Not Allowed | Yes | (No Copies) |
| 0 | 0 | 1 | Copy Freely | Copy Freely | Not Allowed | Not Allowed | Yes | Yes |
| 0 | 1 | 1 | Copy No More | Copy No More | Not Allowed | Not Allowed | (No Copies) | (No Copies) |
| 1 | 0 | 1 | Copy Once | Copy Once | Not Allowed | Not Allowed | Yes | Yes |
| 1 | 1 | 1 | Copy Never | Copy Never | Not Allowed | Not Allowed | (No Copies) | (No Copies) |

N N 0 is an unlikely state

Key
N = Not present
Y = Present
0 = Bit is 0
1 = Bit is 1
RC = Redistribution Control Descriptor
P0, P1 = CGMS-A bits 1 and 2

FIGURE 4B

SYSTEM AND METHOD FOR THE ASSERTION AND IDENTIFICATION OF RIGHTS INFORMATION IN AN ANALOG VIDEO SIGNAL

RELATED APPLICATIONS

This application claims the benefit of U.S. Provisional application Nos. 60/445,660 filed on Feb. 7, 2003, 60/446,726 filed on Feb. 11, 2003, and 60/460,928 filed on Apr. 7, 2003.

BACKGROUND

A. Field of the Invention

This invention pertains to a system and method for inserting copy control information into an analog signal, including a right assertion mark and a CGSM signal.

B. Description of the Prior Art

Copyrighted works normally contain associated rights information. In the case of a book, for example, this information might consist of the name of the author(s) and the date from which copyright is claimed. In more complex cases, such as those related to transmission of audio-visual works over digital transmission media, it may be desirable to convey rights information that goes beyond such basic information. For example, rights information with respect to audio-visual works could, include information on whether copies may be made of the works, how many copies may be made, and whether the works may be retransmitted to another party.

There are various methods of transmitting audio-visual works from a source (the point at which the transmission originates, such as a set-top box, or an optical disc player, such as a DVD player) to a sink (the point at which the work is displayed or recorded for later display). Such methods include robust digital connections using secure transmission technologies such as DTCP on IEEE-1394 high-speed digital links or HDCP on DVI digital links. The most common method for transferring works from a source to a sink utilizes an analog video connection with the transmission being an NTSC or PAL composite video signal. However, when using current techniques, analog delivery does not provide robust protection for a work.

In the context of the protection of audio-visual works, the word "robust" refers to the strength of the copy protection. In analog signaling, the term is used to mean that rights information is transmitted in a way that makes it unlikely that the information would be completely removed inadvertently. In digital signaling, the term indicates that a secure mechanism is used that involves the authentication of the sink device by the source device. Authentication ensures that the source device can trust the sink device to follow the rules. Such secure mechanisms can include the encryption of the rights information and the work during transmission so that any attempt to monitor the transmission will fail. In addition, the rights information can be accompanied by a digital signature, an unforgeable attachment to the rights information that will indicate if unauthorized alterations are made to rights information.

In general, digital links can be robust because the signaling is two-way, while analog links are limited in their robustness in that the sink device cannot typically communicate with the source device.

Unfortunately, in converting a digital work to analog form (for example, an NTSC video signal), the rights information associated with the digital form of the work may be lost or translated into a form that can be subsequently removed. The conversion of the work to an analog video signal is necessary to allow the work to be viewed on a conventional television set or video monitor, the majority of which have only analog video inputs. However, the conversion of the digital form of the work to analog followed by the re-conversion back to a digital form can be used as a means of circumventing the content protection of the work in a digital form.

The problem of the loss of rights information this way is known as the "analog hole" and there are efforts underway to devise ways to "plug" the hole. While certain technologies have been identified and used in an attempt to prevent the loss of rights information upon conversion of digital audio-visual works to analog, there is no equivalently robust protection for protecting analog transmissions of such works that has been accepted for widespread use.

One technology that has been used for the transmission of rights information in an analog video signal is called CGMS-A. CGMS-A is a standard that conveys copy control information (CCI) in the non-visible vertical blanking interval (VBI) of a video signal (FIG. 1). The VBI is the period during which the display device resets its scan line from the bottom of the picture to the top. In NTSC encoded video signals, the CGMS-A information is carried on either or both of lines 20 and 21 of the picture (FIG. 2), which lines are transmitted during the VBI. CGMS-A carries a 2-bit CCI value which can convey the information "copy never", "copy one generation", "copy control not asserted" and, in most definitions of CGMS-A, a fourth state of "copy no more."

Redistribution of an audio-visual work occurs when that work is made available other than through the original distribution means authorized by the rights owner. For example, an audio-visual work is "redistributed" if it is recorded from a free-to-air broadcast and the recording is then made available on the Internet. In-home recording of free-to-air broadcasts is popularly understood to be permitted for the private use of the person making the recording. It is not permitted to take a recording made in this way and make it available to others. To do so constitutes redistribution. Recently a retransmission control (RC) bit has been defined in some CGMS-A standards such as 805A. The RC flag is designed to signal that the content cannot be retransmitted. The RC bit is a third bit of CCI. Herein, the term CGMS-A will include the RC bit unless specifically stated otherwise.

Unfortunately the CGMS-A information occurs in a part of the signal that is not displayed and consequently the loss or removal of the information carried in this part of the signal does not affect the quality of the picture (although it may cause the loss of other information carried in this part of the picture such as closed caption text). CGMS-A is, therefore, not a robust signaling method. Not only can the CGMS-A bits be removed, but because CGMS-A is not required to be present in the video signal and is also trivial to remove, it is not possible to tell whether a video signal has had CGMS-A removed or whether it was even there to begin with.

Historically, watermarks are designs pressed into paper at the time of manufacture to identify the maker. A paper watermark is almost completely invisible until the paper is held up to the light. Watermarking is also the term used for the process of embedding a concealed mark that conveys or indicates rights ownership in a still picture, or video or audio signal such that it is not apparent to the viewer/listener.

Detection of CGMS-A information is simple, requiring no more complexity than is required to interpret an analog video signal for digitization or display. By comparison, the detection of embedded watermarks is often complex, involving advanced signal processing particularly when the watermark to be detected is embedded in the image. The added complexity of detecting a watermark normally adds cost to the device that is required to detect the watermark. Nevertheless, it has been proposed to combine CGMS-A and a watermark in an audio-visual work to provide greater robustness to the analog form of the work.

U.S. Pat. No. 6,433,946 in the name of Ogino that issued on Aug. 13, 2002 and is entitled "Information Signal Output Control Method, Information Signal Duplication Prevention Method, Information Signal Duplication Prevention Device, And Information Signal Recording Medium" proposes using a combined watermark and CGMS-A approach to control play and copying (but not redistribution) of an audio-visual work. The CGMS-A mark is not used in the usual way. Instead, it represents a "don't copy" command only. Not only does the system utilize less information than can be represented by a CGMS-A code, but the watermark in the first embodiment of the Ogino system is redundant with the CGMS-A code. If both signals are present, it means that the audio-visual work has not been tampered with, i.e., it is not an illegal copy. Copies are not permitted in accordance with the two codes, but the work is played. But if only one of the two codes is present, it is an indication that there has been tampering. In this case, not only is copying disabled, but the work is not even played. Only if both signals are absent is copying allowed along with play. In this embodiment of the Ogino system, there is symmetry between the watermark and the CGMS-A signals—the same copy and play controls apply if only one of the signals is present, regardless of which one it is.

The second Ogino embodiment is the same as the first, with one difference. If the GGMS-A signal is present but the watermark is not, play is not inhibited. But it is accompanied by a message that the play is improper. Play is allowed so that the user will not think that there is anything wrong with his television set, but the play is accompanied by interference. The basic control mechanism is the same as the first—neither signal takes precedence over the other, and the presence of one signal without the other is an indication that something improper has taken place before the audio-visual work reached the television set. (In a third embodiment of the Ogino system, which is more sophisticated in that "re-marking" to a "copy no more" state apparently takes place when a work with a "copy one generation" code is played, it is assumed that the CGMS-A signal is already on an audio-visual work, and a watermark is simply added based on the CGMS-A signal.)

A major shortcoming of the Ogino system is that in treating the CCI code and the watermark symmetrically, the CCI code can be used to represent no more than the watermark. That is why the state tables in the Ogino patent drawing simply have "yes" and "no" entries for whether the two signals are present or not. Because the watermark only represents "yes" or "no", and the CCI code is treated symmetrically, the CCI code is restricted to represent only "yes" or "no" as well. The full range of information that is possible with a CGMS-A code is just not used. Instead of extending use of CGMS-A to a third CCI bit, the retransmission control (RC) bit to indicate whether or not the content can be retransmitted, Ogino does not even use the full potential of CGMS-A in its original form.

In contrast to the limitations of Ogino, it is an object of our invention to provide CCI bits (e.g., in the CGMS-A format) in the non-visible vertical blanking interval of a video signal in such a way that, if the bits are removed, it will be possible to tell that they have been removed so that appropriate decisions about play and redistribution of the underlying audio-visual work may be made, the CCI bits conveying more information than simply "copy" and "don't copy." This is accomplished by inserting a video subcarrier component into the visible portion of the video signal.

SUMMARY OF THE INVENTION

Like Ogino, we provide both a signal in the visible portion and CCI bits in the non-visible portion of an audio-visual work. But there the similarity ends as the two forms of information are not otherwise comparable. The basic control mechanism is the code in the VBI, preferably an extended CGMS-A signal. If it is present, then it is obeyed (with respect to both copying and redistribution) whether or not the video subcarrier component is present. The video subcarrier component, which we refer to as RAM, standing for "rights assertion mark", has an effect only if the CGMS-A bits are not present. The presence of RAM simply represents that a CGMS-A signal was present. That is all it represents. If it is present but the CCI bits are not, then the sink device defaults to the most restrictive CCI state. In the case of CGMS-A, this means that copying and redistribution are not permitted. (Play is not controlled at all, as it is in Ogino, since CGMS-A bits do not represent any type of play control.)

The RAM in the audio-visual work is a robust analog signal that is easily detected and, if present, indicates that a less robust rights indicator or signal, such as CGMS-A, is either present or was once present but has been tampered with or removed. The CGMS-A signal remains dominant. The RAM, while more robust, simply tells the sink device whether rights are being asserted.

Although our invention is not limited to use of a particular RAM, one is highly preferred. U.S. Pat. No. 4,807,031 in the name of Broughton, et al. that issued on Feb. 21, 1989 and is entitled "Interactive Video Method and Apparatus" discloses a method and apparatus for in-band, video broadcasting of commands to interactive devices. Control data is encoded into the video image using a "subliminal" modulation scheme, a scheme that can be detected electronically but is largely imperceptible to the viewer. The encoding is in a selected sequence of video image fields. The resulting modulated video fields are within the displayed area of the video (the area that is seen by the viewer), and have alternately proportionately raised and lowered luminance on selected horizontal scan lines. (See FIG. 5.) As disclosed in the patent, the modulation is monitored by a light sensitive device positioned adjacent the user's television screen.

The modulation of the video signal used by Broughton, et al. is referred to herein as "VEIL modulation", VEIL being the commercial name of the system based on the patent. In a sense, VEIL is simpler and easier to implement than the watermarking technology employed by Ogino in that the VEIL modulation can be sensed by looking for a single frequency in the video signal.

For further robustness, the information conveyed by the CGMS-A signal can be confirmed by a secondary CCI indication (SCCI). The SCCI is preferably in watermark form. In the preferred embodiment of the invention, the SCCI is an audio watermark.

BRIEF DESCRIPTION OF THE DRAWINGS

Further objects, features and advantages of the invention will become apparent upon consideration of the following detailed description in conjunction with the drawing, in which:

FIG. 4A is a Rights Assertion Mark (RAM) Logic Table, and sets forth the action to be taken when the presence of the RAM, CGMS-A and RC have been determined (the term CGMS-A includes or does not include the RC bits depending on the context);

FIG. 4B is an alternate Righst Assertion Mark (RAM) Logic Table;

DETAILED DESCRIPTION

Figure 1:
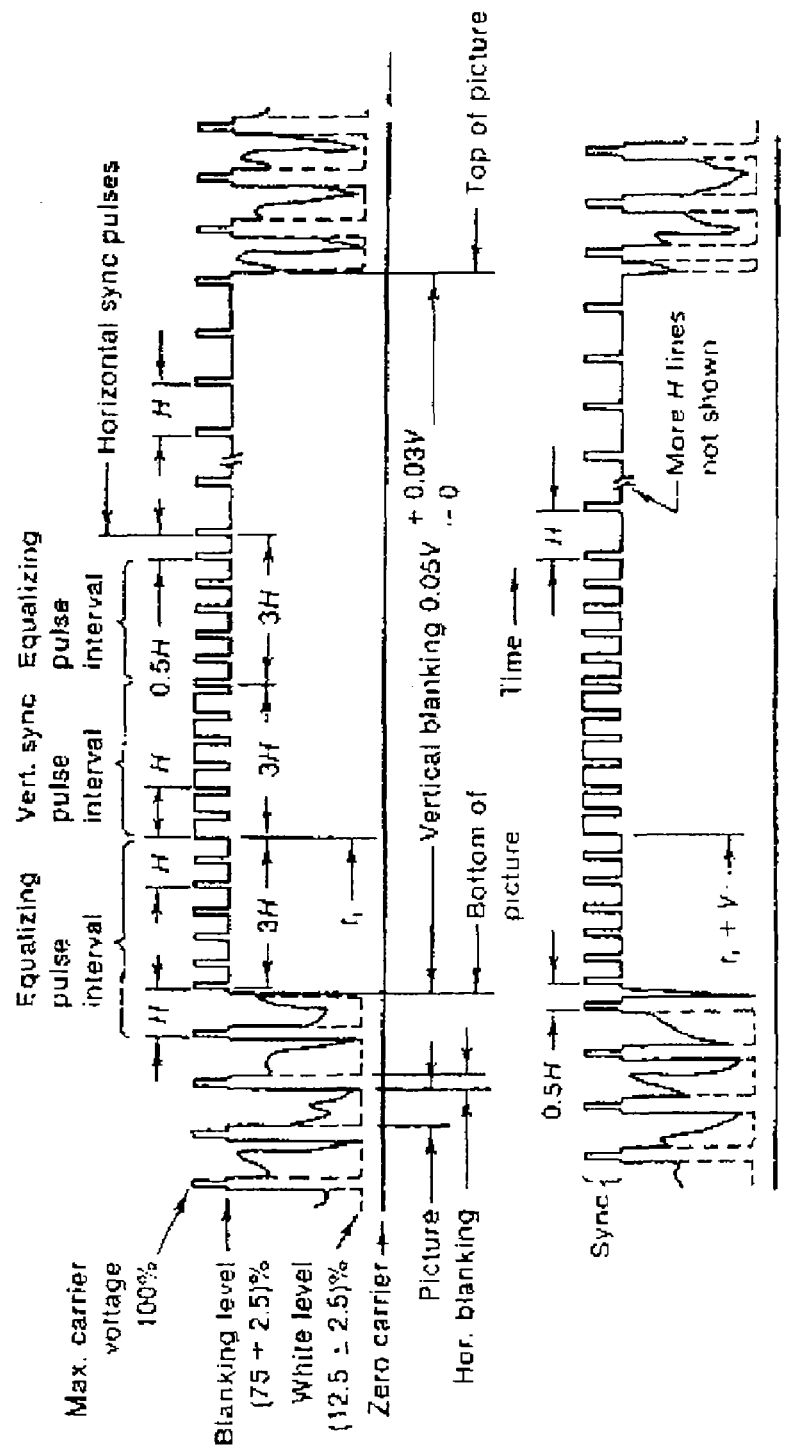
FIG. 1 is the waveform of a NTSC video signal during the vertical blanking interval.
Figure 2:
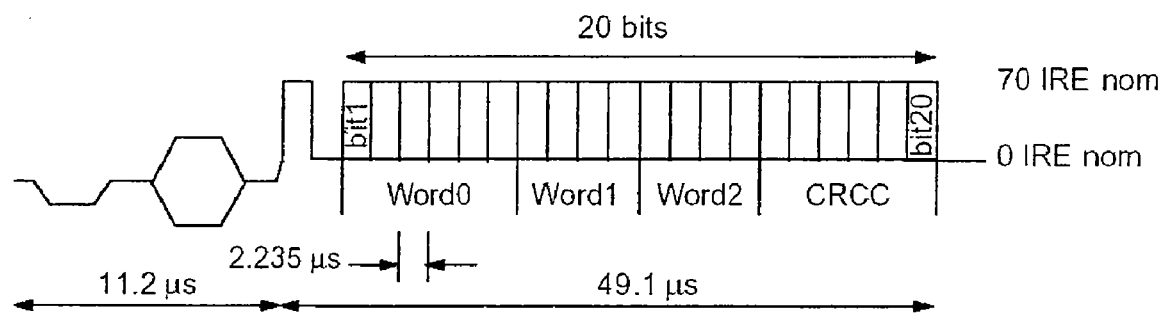
FIG. 2 is the waveform of line 21 of an NTSC video signal showing data embedded in the analog signal.
Figure 5:
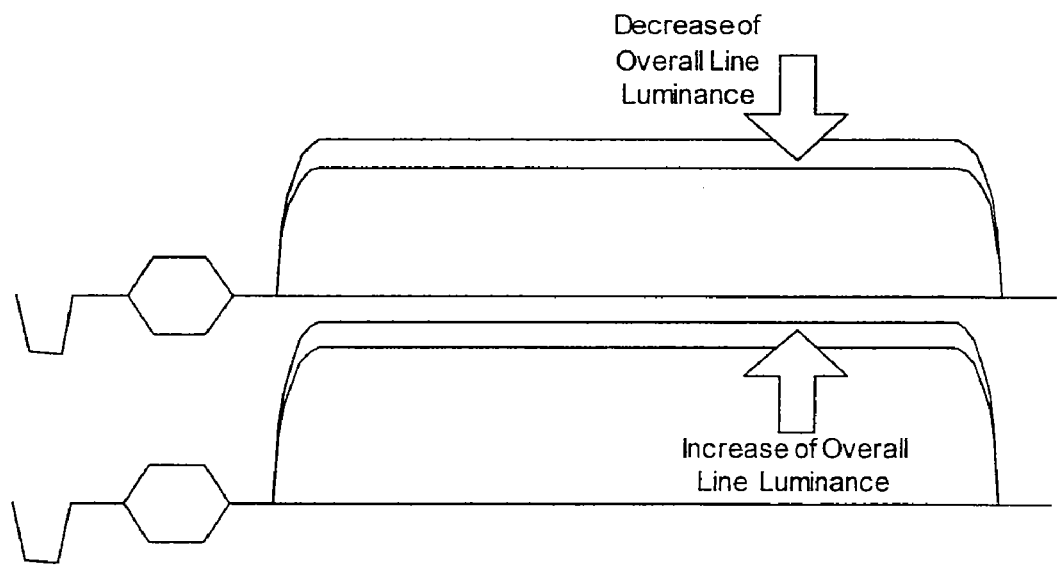
FIG. 5 is the waveform of two adjacent horizontal lines in an NTSC video signal showing how VEIL modulation operates by raising the luminance of one line and by lowering the luminance of the adjacent line.

The invention is a system that uses a mechanism called the Rights Assertion Mark (RAM) to indicate that rights have been asserted for the work together with the conveyance of those rights elsewhere in the work in the primary CCI indicator. Optionally, a secondary CCI indicator (SCCI) that conforms to the CCI bits confirms that the CCI information in the primary indicator has not been altered.

The RAM has a meaning similar to that of a copyright symbol—©—on a publication; it indicates that rights are asserted in the work. The RAM is embedded in the video portion of the work within the area of the visible picture in such a way that the capture of the image will also capture the RAM.

To convey the particular rights information asserted in the work, the RAM is accompanied by a CCI indicator, which in one embodiment may be CGMS-A information including the RC bit. The CCI indicator conveys, for example, how the work may be used. In the situation where the RAM is present, but the CCI indicator is not, this indicates either that the CCI indicator was once present and has been removed, or that the CCI indicator was intended to have been applied to the work, but was not. In such situations, certain default rules govern use of the work.

The system has the advantage of being more robust than CGMS-A signaling by itself and, since it does not require a complex watermark embedded in the image portion of the work, it is less costly to implement than current watermarking techniques.

For further robustness, the value conveyed by the CGMS-A signal can be confirmed by the secondary CCI indication (SCCI). The SCCI can take the form of a watermark. In the preferred embodiment, the SCCI is an audio watermark.

Using the system of the invention allows the sink device to distinguish between CGMS-A signaling on non-commercial content (such as the output from a home camcorder) in which a RAM will not be present, and CGMS-A signaling on commercial content in which a RAM will be present. This is an important distinction to draw because, for example, in copy protection systems for recordable media such as CPRM, commercial content must be protected through encryption when it is recorded and non-commercial content may not be protected through encryption when it is recorded.

The presence of the RAM coupled with the absence of CGMS-A from the video signal indicates that the CGMS-A signal was lost, stripped or not properly added to the video signal by the source device. In this case, the CCI attached to the work cannot be determined from the primary mechanism and, in the absence of the SCCI, any recording device that obeys the CCI must not copy the work.

The system protects against removal of the CGMS-A signal by devices that only process the visible image and also by circumvention devices that blank the lines that carry CGMS-A information. If the SCCI is present, the system protects against the alteration of the CGMS-A information from "Copy Never" to a more permissive CCI by providing the ability to check that the CGMS-A information is conveying the correct rights.

The default state conveyed by detection of the RAM is "Copy Never" and "No Retransmission"/"No Redistribution". The presence of CCI information can alter these defaults. For example, the presence of two bits of the CGMS-A CCI and the third RC bit can permit other uses such as "Copy Once" and "Copy Freely, No Redistribution Allowed".

As described earlier, CGMS-A is a system for copy control. In a system that uses only CGMS-A, the absence of CGMS-A means that use of the content is unrestricted. Therefore, removal of CGMS-A removes restrictions. By contrast, in a system that uses, for example, CGMS-A accompanied by a RAM, the presence of the RAM indicates that restrictions are imposed regardless of whether CGMS-A is present or has been removed. In such a system, the presence of a RAM can be used to convey a default set of rules governing the use of the content, and the presence of CGMS-A can be used to further define permissions, which will typically be less restrictive than the default set of rules, as to how the content may be used. This is an important distinction between the RAM system and other systems. Unless the RAM mark is removed, tampering with the mechanism that conveys the copy control information can only make usage permissions more restrictive.

The RAM can take many forms, both visible and invisible. Preferably, it is in the visible portion of the work and is easy to detect. The following list of alternatives is illustrative, not exhaustive:

1. A concealed mark (which does not need to be a complex watermark).
2. A visible mark such as a sequence of dots in the picture similar to the cue marks on film prints that signal the change over from one reel to the next.

In the preferred embodiment of the invention, the mark is concealed both so that the mark does not interfere with viewing the work, and in order to make removal difficult using, for example, a tool such as PC video editing software.

Figure 6:
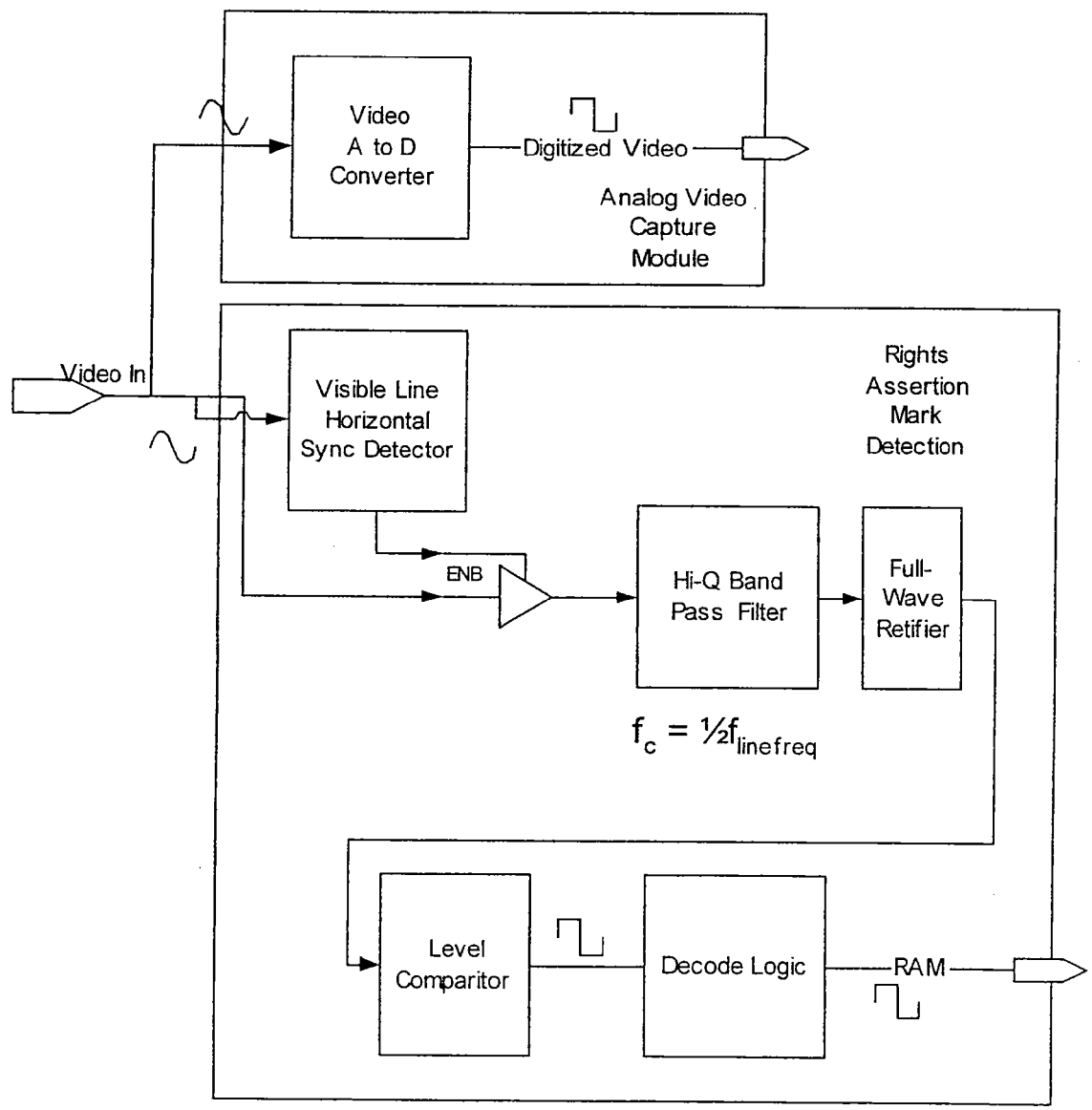
FIG. 6 is a block diagram of a representative method for detecting the presence of the VEIL modulation using electronic coupling to the video signal rather than the optical coupling to the television screen described in U.S. Pat. No. 4,807,031, the block diagram showing how this detection is used in parallel with an analog video capture system.

In the preferred embodiment of the invention, VEIL modulation is used to convey the Rights Assertion Mark (RAM). VEIL modulation is described in detail in U.S. Pat. No. 4,807,031, discussed above. FIG. 6 shows how the RAM signal can be detected. Since alternate lines have their luminance values increased and decreased, a complete cycle of increase/decrease requires two line scans. This means that the VEIL signal occurs at half the line frequency, so all that is required to detect it is a circuit that detects a signal occurring at half the line frequency. By using a high-Q Band Pass filter, as shown in FIG. 6, the VEIL frequency can be isolated. It is then rectified and tested against a threshold. (The Visible Line Horizontal Sync Detector at the input of the RAM Detection circuit is provided so that the filter operates on only visible lines of a complete frame. Since the VEIL signal is not included on lines in the VBI, the filter should not operate on these lines.)

The RAM is a bit sequence (binary number) or pattern encoded into fields or frames of the work using VEIL modulation such that the detection system has a very low false positive indication of the presence of the RAM and an acceptably low false negative indication where it fails to detect the presence of the RAM. The use of a well-known bit sequence or pattern will distinguish the presence of the RAM from other control information that may also be encoded into the video using VEIL modulation.

The VEIL modulation encoded RAM is resilient to casual attack. The RAM can be anywhere in the work. It is not required to be on any particular field or frame of the work, or on any particular line within a field or fields, and it can be inserted repeatedly into the work. Removal thus requires a certain level of sophistication in any circumvention method or device. An improved VEIL modulation scheme is described in application Ser. No. 10/773,944 filed on even date herewith, entitled "Method for Encoding Data in an Analog Video Signal Such That it Survives Resolution Conversion", which application is hereby incorporated by reference.

Since the RAM need only communicate by its presence the simple statement of "rights asserted" indicating that the CCI is conveyed by another mechanism, there is no need to encode any data into the VEIL modulated RAM.

Alternatively, VEIL modulation can be used to convey both RAM and CCI information. For example, the RAM might be extended from a single value to one of several values that indicate the rights information including "copy never" and "copy one generation."

It is necessary to accommodate conversion between multiple video standards, for example the North American standard 525 interlaced system and the ATSC 720 progressive and 1080 interlaced and progressive scan systems. Such conversion is commonly referred to as "up res'ing" indicating that the conversion involves an increase in picture resolution and "down res'ing" indicating that the conversion involves a decrease in resolution. To achieve survivability of such video standard conversion the RAM is encoded into the work multiple times using a plurality of variants of the VEIL modulation scheme. Each variant has different parameters such that at least of one of the variants can still be detected and decoded after any one of the anticipated conversions in video standard.

The optional SCCI (secondary CCI indicator) does not need to be in the visible portion of the work. A preferred embodiment of the SCCI is an industry accepted commercially available audio watermark, the Verance digital watermark used in DVD audio.

Another method to verify the correctness of the CCI is the use of a digital signature attached to the CGMS-A information. Such a CGMS-A signature uses additional data fields in one of the video lines that are used to send data such as CGMS-A and closed captions, for example, line 20 or line 21. The CGMS-A signature is computed using a one-way hash function, a nonce derived from one or more picture frames, and the CCI value of the CGMS-A. It is only necessary to use the CGMS-A signature on CCI values other than "Copy Never" since there is no advantage to be gained by altering the CCI information to "Copy Never."

The nonce is derived from a predetermined portion of a frame or frames using an integration technique based on the value of luminance for a known set of the visible pixels in that set of frames. Basing the calculation of the luminance is the preferred method so that the signature survives the conversion of the picture to black and white.

The signature is calculated for insertion before the work is transmitted and before conversion from its digital representation to an analog representation.

$$\delta = H\!\left(\varphi + \int_{i=1}^{N} \lambda(i)\right)$$

where $\delta$ is the digital signature; H is the one way hash function; $\varphi$ is the CCI value (two bits for CGMS-A); + is the concatenation operator; N is the number of pixels being used to generate the nonce; and $\lambda(i)$ is the luminance value of pixel i.

When the work is received and converted from its analog representation to a digital representation the digital signature is recalculated and the value compared with the signature transmitted in the analog signal. The signature calculated from the re-converted analog signal will likely not be exactly the same as the original signature due to noise in the analog video signal. To accommodate for this noise, the comparison between the received CGMS-A signature and the calculated CGMS-A signature must take these variations in the re-generated signature into consideration and techniques to do this exist.

Figure 3:
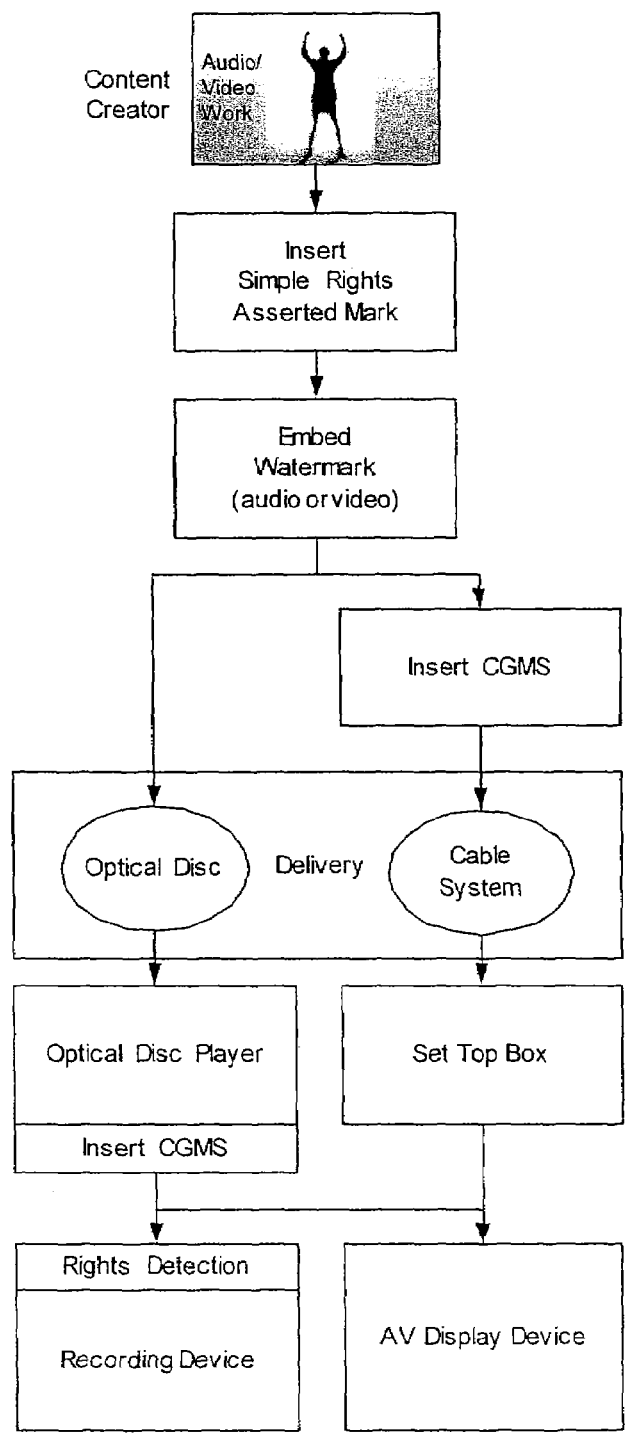
FIG. 3 is a block diagram of a typical transmission path for an audio-visual work showing the points where content marking (rights assertion mark, SCCI watermark or CGMS-A) is added.

The work is created by the content creator, for example, a studio that produces a movie, and is made ready for distribution. Before the work is distributed the content creator adds rights information to the digital embodiment of the work in three different steps, as shown in FIG. 3.

Step 1. The CCI is stored in the rights container that is part of the digital format. For example, in the case of a DVD, the DVD standard requires a player to add CGMS-A to its output analog signal.

Step 2. The RAM is added to the work in a predefined standardized manner, in the preferred embodiment using Veil modulation.

Step 3. Optionally, the content creator can chose to add the SCCI, for example, by embedding a standard audio watermark in the work. Should the content creator choose not to embed the SCCI watermark, a recorder will not be able to determine the CCI if it detects the RAM in the absence of CGMS-A.

The system provides protection against unauthorized analog re-conversion as described above. Before analog re-conversion can take place, the digital version of the work has to be converted to an analog signal by a source device. This is a normal occurrence because many sink devices have only analog inputs. The CGMS-A information on the video signal from the source device can come from one of two places: (1) it is already present in the signal if the work was delivered by a video transmission system where the source device is, for example, a set top box, or (2) the CGMS-A may be added to the analog signal by the source device if the source device is, for example, an optical disc player.

If the sink device is capable of digitizing the analog signal using an analog-to-digital converter, it will check for rights information embedded in the analog video signal in three different places—the RAM, the two CGMS-A CCI bits, and the RC bit.

The RAM logic table of FIG. 4A summarizes the overall system operation. As mentioned above, the invention allows the sink device to distinguish between CGMS-A signaling on non-commercial content (such as the output from a home camcorder) in which a RAM will not be present, and CGMS-A signaling on commercial content in which a RAM will be present. A sink device looks for the CGMS-A information. If it is not present (lines 6 and 7 of the table), the sink device looks for the RAM. If it is also not present, the assumption is that the work is non-commercial and has no rights asserted. Copying is therefore not controlled (line 6). The same applies to redistribution of the work. Copying and redistribution are both unrestricted. But if the RAM is present, and the CGMS-A information is not, it is an indication that tampering with the information has occurred. The sink device writes new "Copy Never" CGMS-A information in the work, copying is not permitted, and redistribution is similarly not allowed (line 7).

In the case of line 1 of the table of FIG. 4A, the redistribution entry is "RC bit, else not controlled." What this means is that if the RC bit is present, its state controls whether redistribution is allowed. If the bit is not present, then no control is asserted over redistribution.

In the next four lines (lines 2 through 5) of the table, the redistribution entry is "RC bit, else not allowed". What this means is that if the RC bit is present, its state controls whether redistribution is allowed. If the bit is not present, then redistribution is not allowed.

If the CGMS-A information is "Copy freely", copying is allowed. But the form the copying takes depends on whether the RAM is present. If it is not present, copying of any form is allowed (line 1). If the RAM is present, indicating that rights are asserted, then while copying is allowed, it has to be done in a protected way—the copying has to be encrypted or protected in some other way.

If the CGMS-A information is "Copy Once" (line 3), then obviously rights are being asserted. A single encrypted copy is all that is allowed, and that copy is marked "Copy No More."

If the CGMS-A bits represent "Copy No More" (line 4), then once again it does not matter whether the RAM is present. A copy is not allowed to be made. Display of the work is all that is allowed. (Display is also allowed in all other lines.)

Finally, a "Copy Never" code (line 5) is treated just as is a "Copy No More" code since what they allow (or more accurately, what they do not allow) is the same when they appear on a work.

FIG. 4B shows a truth table defining an alternate embodiment of the invention, with separate columns provided for bits 1 and 2 (marked P0 and P1, respectively) of the CGMS-A and the RC bit.

In summary, in the preferred embodiment of this invention, a work over which rights are asserted is marked in its analog form in three ways: (1) a primary CCI of CGMS-A in the vertical blanking interval, (2) a RAM encoded in VEIL modulation in the visible portion of the video image in one or more (preferably, more) places and with a plurality of parameter settings to compensate for standards conversion that may take place, and (3) optionally, a SCCI using an audio watermark.

With this combination, circumvention requires a separate attack on each component of the marking system. Even without the optional SCCI, circumvention of the system requires that the CGMS-A information be modified in order to change the rules governing use of the content, which is significantly more difficult than simply removing CGMS-A. Thus, the use of a RAM in combination with a CCI such as CGMS-A will be sufficient to deter casual copying. The use of the RAM distinguishes between commercial and non-commercial works, and between works that either never had CCI such as CGMS-A and works where the CCI has been lost.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A method for processing an analog video signal that represents a work for which rights information is asserted, the signal including a rights assertion mark (RAM) in the video portion of the signal within the visible picture such that capture of the picture will include the mark, and copy control information (CCI) bits in the vertical blanking interval of the signal for representing copying and redistribution rules;

comprising the steps of:

determining if the RAM and CCI bits are present in the work, if the RAM is present and the CCI bits are present, then applying the copying and redistribution rules represented by the CCI bits, and if the RAM is present but the CCI bits are not, then applying the most restrictive copying and redistribution rules that can be represented by the CCI bits;

wherein the CCI bits are represented as CGMS-A information, the most restrictive copying rule is "copy never", and the most restrictive redistribution rule is "no redistribution".

2. A method for processing an analog video signal that represents a work for which rights information is asserted in accordance with claim 1 wherein the RAM is represented by VEIL modulation of the video signal.

3. A method for processing an analog video signal that represents a work for which rights information is asserted in accordance with claim 2 wherein the video signal further includes secondary copy control information (SCCI) that conforms with the CCI bits, and if the RAM and SCCI bits are present but the CCI bits are not, then the copying and redistribution rules represented by the SCCI bits are applied.

4. A method for processing an analog video signal that represents a work for which rights information is asserted in accordance with claim 3 wherein the SCCI bits are in the form of a watermark in the audio portion of the analog video signal.

5. A method for processing an analog video signal that represents a work for which rights information is asserted in accordance with claim 3 wherein the SCCI bits are in the form of a digital signature in the vertical blanking interval of the analog video signal, where the digital signature is a function of the CCI bits and selected pixels of the visible picture of the work.

6. A method for processing an analog video signal that represents a work for which rights information is asserted in accordance with claim 1 wherein the video signal further includes secondary copy control information (SCCI) that conforms with the CCI bits, and if the RAM and SCCI bits are present but the CCI bits are not, then applying the copying and redistribution rules represented by the SCCI bits.

7. A method for processing an analog video signal that represents a work for which rights information is asserted in accordance with claim 6 wherein the SCCI bits are in the form of a watermark in the audio portion of the work.

8. A method for processing an analog video signal that represents a work for which rights information is asserted in accordance with claim 6 wherein the SCCI bits are in the form of a digital signature in the vertical blanking interval of the analog video signal, where the digital signature is a function of the CCI bits and selected pixels of the visible picture of the work.

9. A method for asserting and identifying rights information in a work represented by an analog video signal, comprising the steps of:
   inserting a rights assertion mark (RAM) in the video portion of the signal within the visible picture such that capture of the picture will include the mark, and
   inserting copy control information (CCI) bits in the vertical blanking interval of the signal for representing copying and redistribution rules, wherein the CCI bits are represented as CGMS-A information, the most restrictive copying rule is "copy never", and the most restrictive redistribution rule is "no redistribution.",
   where the signal is to be processed by a device that operates on it as follows:
   (i) if the RAM is present and the CCI bits are present, then the copying and redistribution rules represented by the CCI bits are applied, and
   (ii) if the RAM is present but the CCI bits are not, then the most restrictive copying and redistribution rules that can be represented by the CCI bits are applied.

10. A method for asserting and identifying rights information in a work represented by an analog video signal in accordance with claim 9 wherein the RAM is represented by VEIL modulation of the video signal.

11. A method for asserting and identifying rights information in a work represented by an analog video signal in accordance with claim 10 further including the step of inserting in the signal secondary copy control information (SCCI) that conforms with the CCI bits.

12. A method for asserting and identifying rights information in a work represented by an analog video signal in accordance with claim 11 wherein the SCCI bits are in the form of a watermark in the audio portion of the work.

13. A method for asserting and identifying rights information in a work represented by an analog video signal in accordance with claim 11 wherein the SCCI bits are in the form of a digital signature in the vertical blanking interval of the analog video signal, where the digital signature is a function of the CCI bits and selected pixels of the visible portion of the work.

14. A method for processing an analog video signal that represents a work for which rights information is asserted, the signal including
   a rights assertion mark (RAM) presented by a Veil modulation of the video portion of the signal within the visible picture such that capture of the picture will include the mark, and
   copy control information (CCD) bits for representing copying rules, said CCI bits being represented as CGMS-A information in the vertical blanking interval of the analog signal;
   comprising the steps of:
   determining if the RAM and CCI bits are present in the work,
   if the RAM is present and the CCI bits are present, then applying the copying rules represented by the CCI bits, and
   if the RAM is present but the CCI bits are not, then applying default copying rules;
   wherein the video signal further includes secondary copy control information (SCCI) that conforms with the CCI bits, and if the RAM and SCCI bits are present but the CCI bits are not, then the copying and redistribution rules represented by the SCCI bits are applied.

15. A method for processing an analog video signal that represents a work for which rights information is asserted in accordance with claim 14 wherein the SCCI bits are in the form of a watermark in the audio portion of the work.

16. A method for processing an analog video signal that represents a work for which rights information is asserted in accordance with claim 14 wherein the SCCI bits are in the form of a digital signature in the vertical blanking interval of the analog video signal, where the digital signature is a function of the CCI bits and selected pixels of the visible picture portion of the work.

17. A method of controlling the processing of an analog video signal in a player device using Copy Control Information (CCI) rules, wherein said analog video signal includes CCI bits and a rights assertion mark (RAM) confirming the presence of CCI bits in the analog video signal, comprising the steps of:
   checking said signal for said CCI bits and said RAM;
   if both are present then operating said device in accordance with said CCI bits;
   if said RAM is present but said CCI bits are absent then operating said device in a default mode; and
   if said CCI bits are absent, said device is operated in a mode in which said analog video signal cannot be redistributed.

18. The method of claim 17 wherein said CCI bits represent CGMS-A information.

19. The method of claim 17 wherein said video signal includes vertical blanking periods and said CCI bits are imbedded in said vertical blanking periods.

20. The method of claim 17 wherein said RAM is implemented using VEIL modulation of said analog video signal.

21. The method of claim 17 wherein in the absence of said CCI bits, said device is operated in a mode in which said analog video signal cannot be recorded.

* * * * *